(12) United States Patent
Ziolek et al.

(10) Patent No.: US 9,823,435 B2
(45) Date of Patent: Nov. 21, 2017

(54) MOVING A NONLINEAR CRYSTAL OR A SATURABLE ABSORBER IN TWO DIMENSIONS

(71) Applicant: Trumpf Laser Marking Systems AG, Grüsch (CH)

(72) Inventors: Carsten Ziolek, Seewis-Dorf (CH); Dirk Bueche, Fanas (CH); Thomas Huerlimann, Bad Ragaz (CH); Erich Sprecher, Mollis (CH); Nikolaus Willi, Chur (CH)

(73) Assignee: Trumpf Laser Marking Systems AG, Gruesch (CH)

( * ) Notice: Subject to any disclaimer, the term of this patent is extended or adjusted under 35 U.S.C. 154(b) by 0 days.

(21) Appl. No.: 15/226,021

(22) Filed: Aug. 2, 2016

(65) Prior Publication Data

US 2016/0341925 A1 Nov. 24, 2016

Related U.S. Application Data

(63) Continuation of application No. PCT/EP2015/051452, filed on Jan. 26, 2015.

(30) Foreign Application Priority Data

Feb. 5, 2014 (EP) .................................... 14154043

(51) Int. Cl.
*G02F 1/35* (2006.01)
*G02B 7/00* (2006.01)

(52) U.S. Cl.
CPC ........... *G02B 7/005* (2013.01); *G02F 1/3501* (2013.01); *G02F 2001/3505* (2013.01)

(58) Field of Classification Search
CPC .............. G02B 7/00; G02B 7/005; G02F 1/35
(Continued)

(56) References Cited

U.S. PATENT DOCUMENTS 3,902,084 A 8/1975 May, Jr.
5,268,621 A * 12/1993 Hamers ................. B82Y 15/00
310/317

(Continued)

FOREIGN PATENT DOCUMENTS

EP 0938144 A2 8/1999

OTHER PUBLICATIONS

International Search Report for corresponding PCT Application No. PCT/EP2015/051452, dated Apr. 10, 2015, 6 pages.
(Continued)

*Primary Examiner* — Daniel Petkovsek
(74) *Attorney, Agent, or Firm* — Fish & Richardson P.C.

(57) ABSTRACT

A device for moving a nonlinear crystal or a saturable absorber in two dimensions includes a first and a second piezo unit, each having a corresponding carrier, piezo driver, and carriage moveable by the piezo driver at incremental steps along a linear path with respect to the carrier between a first and a second end location, in which the linear paths of the first piezo unit and the second piezo unit are orthogonal. The nonlinear crystal/saturable absorber is fastenable on the carriage of the first piezo unit and the carrier of the first piezo unit is fastened on the carriage of the second piezo unit. The device further includes stops that define the carriage end locations, an end location detection configured to detect the carriages at their respective end locations, and a counting unit configured to count the steps covered during the moving of the carriage.

5 Claims, 2 Drawing Sheets

(58) Field of Classification Search
USPC .................................................. 359/326–332
See application file for complete search history.

(56) References Cited

U.S. PATENT DOCUMENTS

| | | | |
|---|---|---|---|
| 6,154,327 A * | 11/2000 | Yoon | G02B 7/005 359/813 |
| 6,437,929 B1 * | 8/2002 | Liu | G02B 6/3582 359/819 |
| 6,859,335 B1 | 2/2005 | Lai et al. | |
| 8,482,868 B2 * | 7/2013 | Thomas | G01B 7/16 359/694 |
| 2005/0231075 A1 | 10/2005 | Xu | |
| 2009/0224718 A1 | 9/2009 | Honjo et al. | |
| 2010/0115671 A1 | 5/2010 | Pryadkin et al. | |
| 2010/0117565 A1 | 5/2010 | Moloni et al. | |
| 2010/0148629 A1 | 6/2010 | Bexell et al. | |
| 2010/0301710 A1 | 12/2010 | Pryadkin et al. | |
| 2012/0200240 A1 | 8/2012 | Yoshida | |

OTHER PUBLICATIONS

Jungnickel, Uwe, "Miniaturized positioning systems with several degrees of freedom based on monolithic structures", Dissertation, Mar. 13, 1972.

Notification of Transmittal of Translation of the International Preliminary Report on Patentability and Written Opinion of the International Searching Authority for corresponding PCT Application No. PCT/EP2015/051452, dated Aug. 9, 2016, 10 pages.

* cited by examiner

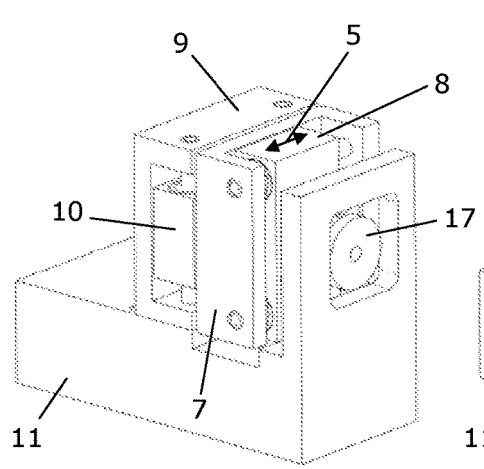 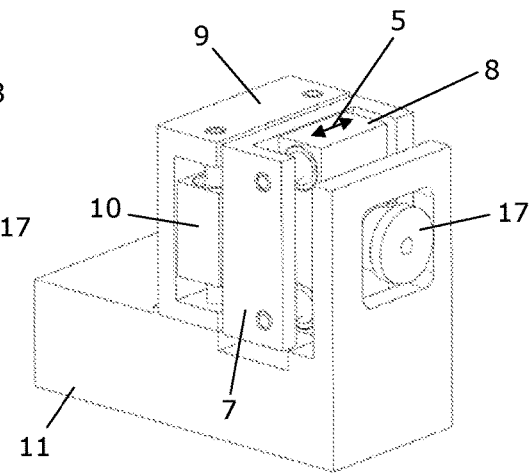
Fig. 4  Fig. 5
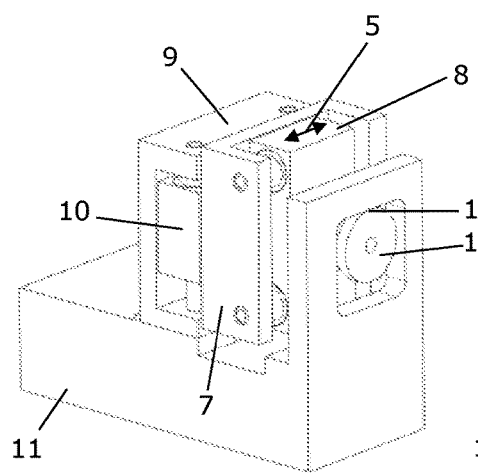 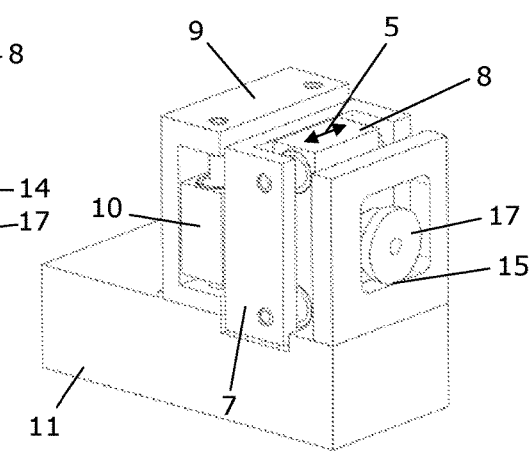
Fig. 6  Fig. 7

MOVING A NONLINEAR CRYSTAL OR A SATURABLE ABSORBER IN TWO DIMENSIONS

CROSS-REFERENCE TO RELATED APPLICATIONS

This application is a continuation of and claims priority under 35 U.S.C. §120 to PCT Application No. PCT/EP2015/051452 filed on Jan. 26, 2015, which claims priority to European Application No. EP 14 154 043.5, filed on Feb. 5, 2014. The contents of both of these priority applications are hereby incorporated by reference in their entirety.

TECHNICAL FIELD

The present disclosure relates to moving a nonlinear crystal or a saturable absorber in two dimensions.

BACKGROUND

Stepping motors may be used, for example, in a moving device, as described in U.S. Pat. No. 6,859,335B1 for positioning optical elements, such as nonlinear crystals or saturable absorbers. The stepping motors may include synchronous motors, in which the rotor is rotated step-by-step by a controlled electromagnetic field. The number of the steps covered by the stepping motor may be counted in stepping motor drives to determine a sufficiently accurate position. Stepping motor drives typically include a large number of mechanical and also electronic components, which can outgas and therefore contribute to damage to the nonlinear crystal or saturable absorber.

The position of a moving device may be determined by a Hall sensor, as described in the dissertation "Miniaturisierte Positioniersysteme mit mehreren Freiheitsgraden auf der Basis monolithischer Strukturen [Miniaturized positioning systems having multiple degrees of freedom on the basis of monolithic structures]" by Uwe Jungnickel (Darmstadt Technical University).

Miniaturized positioning systems and/or miniaturized moving devices are available, in which the adjustment or moving motions are based on the drive of piezo units and/or piezo drivers. Piezo units generally cause a step-by-step drive of the moving parts, in which the length of the incremental step can vary over a relatively wide range, since it is force-dependent. For example, the piezo elements may degrade with time, which leads to a change in the length of the incremental step. In turn, this may lead to a location dependence of the moving device. For instance, the length of the incremental step of a horizontally moving device may deviate from the incremental step of a moving device moving in a vertical or inclined direction. Monitoring or checking the accurate position of the moving device requires using complex, costly, and sensitive path measurement systems.

SUMMARY

The present disclosure relates to a moving device and a method for determining the length of the incremental step provided by such a moving device. In general, in a first aspect, a piezo moving device and, in a second aspect, a corresponding method is provided. An advantage of the piezo moving device and method are that they may, in some implementations, enable accurate, reliable, simple and rapid positioning and/or accurate determination of the length of an incremental step of nonlinear crystals or saturable absorbers without requiring a complex path measurement system.

During the movement of the stepper motor carriages, the number of steps covered in each case from the first end location into the second end location may be counted by a counting unit. By dividing a previously known distance along a moving path by the number of the counted steps, the incremental step may then be determined as a result of the division. In this manner, the incremental step, which is fundamentally subject to force and wear and is therefore also location-dependent, of carriages moved by piezo positioning units may be determined in a simple manner. For example, the incremental step length may be determined after an application-related refitting of the moving device into another machine or into another location of the same machine. If the incremental step is determined, the present position of the carriages may be calculated by counting the steps covered in each case. The determination of the incremental step length may be carried out, depending on the application, regularly in predetermined cycles or, if needed, in a single instance by the moving device. The moving device according to the present disclosure dispenses with complex position measurement systems having electronic components, so that the moving device avoids the risk of outgassing. In addition, in some implementations, the piezo positioning units may enable small incremental steps and therefore very accurate movement ability of the carriage and/or the crystal fastened to the carriage.

The counting unit is operable to count the steps covered in each case from the first location into the second end location or vice versa during the movement of the carriages. Stops may be formed, for example, on the carrier of the piezo positioning unit. The stops represent an obstruction for the carriage, and accordingly stop the moving motion of the carriage in a moving direction at the corresponding end location. The first piezo positioning unit includes the carriage, which is movable with respect to a carrier by the piezo driver step-by-step from the first end location along the moving path into the second end location and back. The nonlinear crystal can be, for example, a crystal of the type LBO ($LiB_3O_5$), BBO ($\beta$-$BaB_2O_4$), and CLBO ($CsLiB_6O_{10}$). However, other nonlinear crystals are also possible. The size and/or dimensions of the nonlinear crystals are typically 2 mm to 4 mm. The incremental steps of the moving device may be dependent on the laser spot size and are generally between 20 µm and 100 µm. For example, so-called SESAMs can be used as saturable absorbers.

In some implementations, a contact element for touching the stops is formed on the carriage of the first piezo positioning unit. The contact element may be used to provide a clear and defined occupation of the carriage position in the two end locations. The contact element may be embodied as a replaceable or exchangeable component, to counteract wear which can possibly occur upon touching the stops.

In some implementations, all stops of the moving device form a single piece, e.g., a monolithic, stop element. The single stop element then may be used for each one of multiple piezo positioning units (a first positioning unit, a second positioning unit, or an additional positioning unit) to detect the respective end locations of the different positioning units. In this manner, the number of the components of the moving device may be reduced and a monolithic construction is possible. As an example, the stop element may be formed as a stop frame.

In some implementations, the moving device includes a control unit having an analysis unit operable to calculate the distance traveled by each incremental step from the distance along moving path or paths and the number of the counted steps. The analysis unit may be connected for communicating with the counting unit or units and to the end location detectors, which may be arranged on the stops, of the individual piezo positioning units or to an electrical voltage unit for performing end location detection. Furthermore, the values for the distance along moving path or paths of the individual piezo positioning units may be saved or stored in the analysis unit. It is also possible to store the moving paths as the results of the end location determination in the analysis unit. The analysis unit may therefore acquire the signals of the end location detectors and the signals of the counting units and carry out the determination of the respective incremental steps. The end location detectors may also each be configured as switching elements having a defined switching point.

In some implementations, the end location detector includes an electrical voltage unit, which is configured to provide an electrical potential between the carriage and the stops. Therefore, when the carriage occupies the respective end location and touches the corresponding stop at the same time, a circuit may be closed and therefore a detection signal may be transmitted (for example, to the analysis unit). Electrical contacts may be provided both on the carriage side and also on the stop side for this purpose. Alternatively, end location detectors arranged on the stops may be provided for the detection of the end locations of the carriage. These can include force-triggered switching devices, such as, for example force sensors.

In general, in another aspect, the present disclosure covers methods for determining the distance traveled by an incremental step of a moving device as described herein.

The methods may, in some implementations, provide a simple, rapid and accurate determination of the length of the incremental steps without requiring a complex measurement of the position of the carriages. Following the determination of the length of the incremental steps, the present position of the carriages may be determined by counting the steps covered from a known reference position (for example, at one of the end locations). The determination of the length of the incremental step may be carried out regularly in predetermined cycles or at a single time as needed depending on the application. Each of the carriages is generally moved linearly along a corresponding known moving path, in which the step-by-step moving is carried out by the piezo drivers. A counting unit counts the number of steps of the piezo driver during the movement of the carriages from the first end location to the second end location (or vice versa).

In some implementations, the carriages are each positioned at the stop of the first end location thereof before the step-by-step moving of the carriages and are subsequently moved along the moving path up to the stop of the second end location thereof. A clear and defined occupation of the carriage position in the two end locations is possible by way of the stops. A carriage moved along a first direction into an end location comes to a standstill at the end location and may be removed or moved away from the end location again by a movement in the direction opposite with respect to the first direction.

In some implementations, the end locations of the carriages are detected by an electrical voltage acting between the carriages and the stops. An unambiguous confirmation that the carriage (or carriages) occupy the end location position is possible by detecting the voltage. Alternatively, detection of the presence of the carriage (or carriages) at the first end location also may be carried out by a first end location detector provided on the first stop. Similarly, detection of the presence of the carriage (or carriages) at the second end location may be carried out by a second end location detector provided on the second stop.

Further advantages of the subject matter of the present disclosure are apparent from the description, the claims, and the drawings. The features disclosed herein may be used alone or in multiple arbitrary combinations. The implementations shown and described are not to be understood as an exhaustive list, but rather are provided as examples. The subject matter illustrated in the figures are not to scale.

BRIEF DESCRIPTION OF THE DRAWINGS

FIG. 4 is a schematic that illustrates the moving device of FIG. 1 with a carriage moved into a left end location.

FIG. 5 is a schematic that illustrates the moving device of FIG. 1 with a carriage moved into a right end location.

FIG. 6 is a schematic that illustrates the moving device of FIG. 1 with a carriage moved into an upper end location.

FIG. 7 is a schematic that illustrates the moving device of FIG. 1 with a carriage moved into a lower end location.

DETAILED DESCRIPTION

Figure 1:
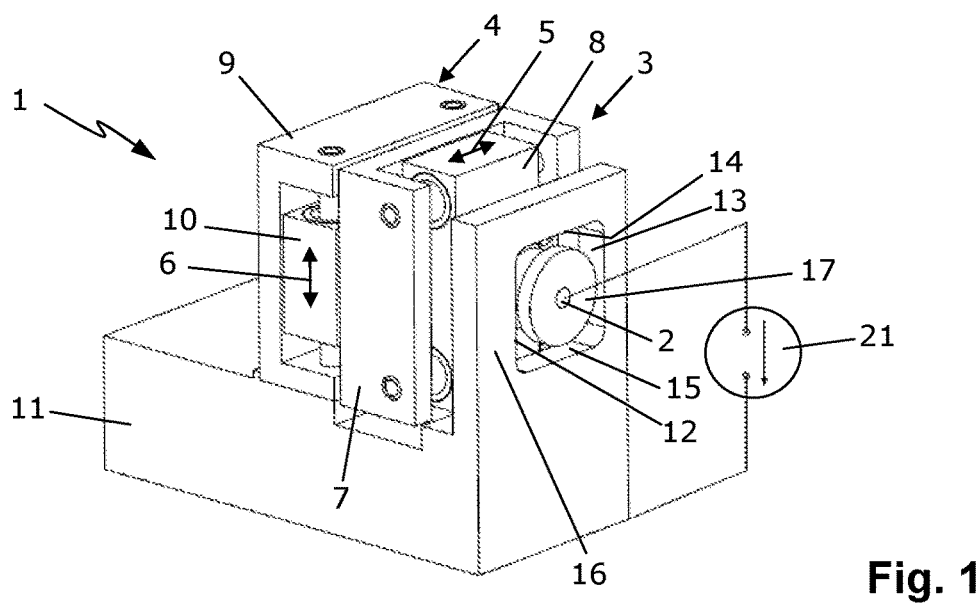
FIG. 1 is a schematic that illustrates a perspective view of an example of a device for moving a crystal or a saturable absorber in two dimensions.
Figure 2:
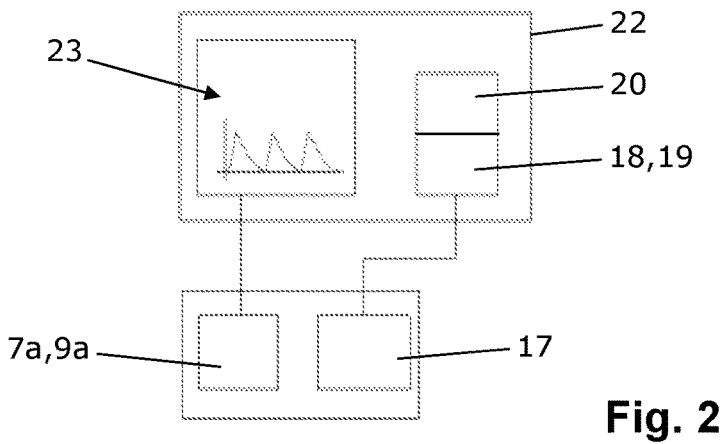
FIG. 2 is a schematic that illustrates an example of a circuit diagram of a control unit that is electrically connected to the exemplary moving device of FIG. 1.

FIGS. 1 and 2 are schematics that illustrate a moving device 1 for moving a nonlinear crystal 2. The moving device 1 has a first piezo positioning unit 3 and a second piezo positioning unit 4, each of which has a respective linear moving paths or moving directions 5, 6. The moving paths/directions 5, 6 are arranged orthogonally in relation to one another.

The first piezo positioning unit 3 includes a first carrier 7, a first piezo drive 7a, and a first carriage 8, in which the first carriage 8 is movable with respect to the first carrier 7 step-by-step in the first moving direction 5 between two end locations along the first moving path by the first piezo drive 7a. The second piezo positioning unit 4 includes a second carrier 9, a second piezo drive 9a, and a second carriage 10, in which the second carriage 10 is movable with respect to the second carrier 9 step-by-step in the second moving direction 6 between two end locations along the second moving path by the second piezo drive 9a. The second carrier 9 is fastened on a base body 11 of the moving device 1.

The first carrier 7 is fastened on the second carriage 10 so that the crystal 2 arranged on the first carriage 8 can be moved into different positions in a two-dimensional plane spanned by the two moving directions 5, 6 by way of the superposition of the moving motions of the two carriages 8, 10 (see, e.g., the positions and/or end locations shown in FIGS. 4 to 7 and described herein).

The moving device 1 also includes, for each of the first piezo positioning unit 3 and the second piezo positioning unit 4, stops 12, 13, 14, 15 arranged in each case on the two end locations of the different positioning units. The stops 12, 13, 14, 15 jointly form a stop element 16 designed as a monolithic frame. If a contact element 17 formed on the first carriage 8 touches one of the stops 12, 13, 14, 15, a circuit may be closed by a voltage unit 21 resulting in the generation of an "end location detection" signal (e.g., a signal that indicates the contact element 17 of the first carriage 8 touches the stop element 16 at one of the stops 12, 13, 14, 15). The voltage unit 21 applies an electrical potential between the carriage 8 and the stops 12, 13, 14, 15 and/or between the contact element 17 and the stops 12, 13, 14, 15. A determination as to whether it is the left or right (or upper or lower) stop 12, 13, 14, 15 that is contacted by the contact element 17 of the first carriage 8 may be made when it is known in which moving direction 5, 6 the first carriage 8 was previously moved in each case. That is, the same detection signal is obtained in the different moving directions 5, 6 as a result of the one-piece stop element 16. The stop element 16 and/or the frame having the stops 12, 13, 14, 15 is formed on the base body 11. The contact element 17 and the two piezo positioning units 3, 4 are shown in a middle position in FIG. 1.

The moving device 1 also includes a control unit 22 having a first and a second counting unit 18, 19 for counting the steps covered in each case during the moving of the first or second carriage 8, 10, respectively, and an analysis unit 20 for calculating the incremental steps along the moving paths and the number of the counted steps. The moving device 1 enables, in some implementations, simple, rapid and accurate determination of the incremental steps of the individual piezo positioning units 3, 4 without complex position measurement systems. The counting units 18, 19 are arranged in the control unit 22 and count the steps of the carriages 8, 10 by an analysis of the driving signal 23.

Figure 3:
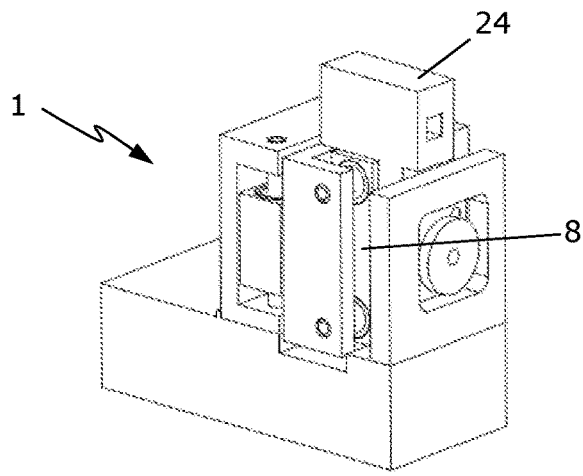
FIG. 3 is a schematic that illustrates a perspective view of an example of a device for moving a crystal, in which the device includes a crystal holder.

As shown in FIG. 3, a crystal holder 24 is fastened on the carriage 8 of the moving device 1 to hold a nonlinear (e.g., laser) crystal. Alternatively to the nonlinear crystal 2, a holder for the saturable absorber, such as a SESAM, can also be arranged on the carriage 8 in the moving devices 1 of FIGS. 1 and 3-7.

An example of a method for determining the respective incremental steps will be explained in greater detail with reference to FIGS. 4 to 7.

The first carriage 8 and/or the contact element 17 of the first carriage 8 is shown in four different end locations in FIGS. 4 to 7. In each case, the first carriage 8 is moved accordingly with respect to the first carrier 7 and the second carriage 10 is moved with respect to the second carrier 9 or the base body 11. In detail, FIG. 4 shows a left end location of the first carriage 8 and/or the contact element 17 formed thereon, FIG. 5 shows a right end location of the first carriage 8 and/or the contact element 17 formed thereon, FIG. 6 shows an upper end location of the first carriage 8 and/or the contact element 17 formed thereon, and FIG. 7 shows a lower end location or end location position of the first carriage 8 and/or the contact element 17 formed thereon.

As an example, to determine the incremental step of the first carriage 8 in the first moving direction 5, during the step-by-step moving of the first carriage 8 from a first, upper end location (see, e.g., FIG. 6) into a second, lower end location (see, e.g., FIG. 7), the steps covered are counted, and subsequently the length of a previously known moving path, which is delimited by the distance of the two end locations, is divided by the number of the counted steps, to obtain the length of each incremental step as the result of the division. The second carriage 10 can be moved in a similar manner. That is, the second carriage 10 may be moved from a first, left end location (see, e.g., FIG. 4) into a second, right end location (see, e.g., FIG. 5), where the steps covered in this example are counted to determine the length of each incremental step of the second carriage 10. In each case, the total length of the first moving path and the total length of the second moving path is required to count the steps. As shown in the examples of FIGS. 6 and 7, the first carriage 8 is positioned before commencing the step-by-step moving at the one stop 14 arranged at the upper end location and subsequently moved completely along the linear moving path up to the other stop 15 arranged at the second, lower end location. In this example, the two end locations of the carriage 8 and/or the contact element 17 are detected by the end location detectors provided at the stops 14, 15.

The stop element 16 and/or the frame can fundamentally delimit the moving paths of the carriages 8, 10 so that the piezo drives 7a, 9a do not extend up into their respective end positions, but instead the respective carriages 8, 10 are stopped beforehand at the stops 12, 13, 14, 15 of the stop element 16. Reliable positioning of the nonlinear crystal 2 can be ensured by such delimiting of the moving paths.

A number of implementations have been described. Nevertheless, it will be understood that various modifications may be made without departing from the spirit and scope of the invention. Accordingly, other implementations are within the scope of the following claims.

What is claimed is:

1. A device for moving a nonlinear crystal or a saturable absorber in two dimensions, the device comprising:
   a first piezo positioning unit comprising a first carrier, a first piezo driver, and a first carriage moveable by the first piezo driver at incremental steps along a first linear path with respect to the first carrier between a first end location and a second end location;
   a second piezo positioning unit comprising a second carrier, a second piezo driver, and a second carriage moveable by the second piezo driver at incremental steps along a second linear path with respect to the second carrier between a third end location and a fourth end location, the second linear path being orthogonal to the first linear path, wherein the nonlinear crystal or the saturable absorber is fastenable to the first carriage of the first piezo positioning unit and wherein the first carrier of the first piezo positioning unit is fastened to the second carriage of the second piezo positioning unit;
   a plurality of stops, wherein each stop of the plurality of stops defines a different corresponding end location of the first through fourth end locations;
   a detector comprising an electrical voltage unit electrically coupled to the plurality of stops, wherein the detector is operable to detect the first carriage at the first end location and at the second end location and is operable to detect the second carriage at the third end location and at the fourth end location;
   a counting unit operable to count a number of incremental steps covered by the movement of the first carriage along the first linear path and operable to count a number of incremental steps covered by the movement of the second carriage along the second linear path; and
   a contact element arranged on the first carriage of the first piezo positioning unit, wherein the contact element is operable to touch each stop of the plurality of stops, and wherein the plurality of stops are configured as a single stop element that is fixed to the second carrier.

2. The device of claim 1, comprising a control unit coupled to the counting unit, the control unit comprising an analysis unit, wherein the analysis unit is operable to:

calculate a distance of each incremental step along the first linear path from a length of the first linear path between the first end location and the second end location and from the number of incremental steps covered by the movement of the first carriage along the first linear path; and calculate a distance of each incremental step along the second linear path from a length of the second linear path between the third end location and the fourth end location and from the number of incremental steps covered by the movement of the second carriage along the second linear path.

3. The device of claim 1, wherein the plurality of stops are configured as a single monolithic stop element.

4. A method for determining the length of an incremental step of the first carriage and the second carriage of the device of claim 1, the method comprising:

detecting the first end location and the second end location of the first carriage by a first electric signal and a second electric signal when the contact element of the first carriage electrically contacts a first stop of the plurality of stops and a second stop of the plurality of stops, respectively;

counting, by a counting unit of the device, a first number of incremental steps covered by movement of the first carriage along the first linear path from the first end location to the second end location;

detecting a third end location and a fourth end location of the second carriage by a third electric signal and a fourth electric signal when the contact element electrically contacts a third stop of the plurality of stops and a fourth stop of the plurality of stops, respectively;

counting, by the counting unit, a second number of incremental steps covered by movement of the second carriage along the second linear path from the third end location to the fourth end location;

dividing a distance between the first end location and the second end location by the first number of incremental steps to provide a distance covered by each incremental step along the first linear path; and dividing a distance between the third end location and the fourth end location by the second number of incremental steps to provide a distance covered by each incremental step along the second linear path.

5. The method of claim 4, wherein the first carriage is positioned at the first stop arranged at the first end location, the second carriage is positioned at the third stop arranged at the third end location, the method further comprising:

moving the first carriage by the first piezo driver from the first end location to the second stop at the second end location; and moving the second carriage by the second piezo driver from the third end location to the fourth stop at the fourth end location.

\* \* \* \* \*